| United States Patent [19] | [11] | 4,163,812 |
|---|---|---|
| Coucher | [45] | Aug. 7, 1979 |

[54] CONTAINER COATING METHOD

[75] Inventor: Robert G. Coucher, Salt Lake City, Utah

[73] Assignee: W. R. Grace & Co., Cambridge, Mass.

[21] Appl. No.: 855,960

[22] Filed: Nov. 30, 1977

Related U.S. Application Data

[63] Continuation of Ser. No. 502,811, Sep. 3, 1974, abandoned, which is a continuation-in-part of Ser. No. 140,838, May 6, 1971, abandoned, Ser. No. 223,969, Feb. 7, 1972, Pat. No. 3,987,937, and Ser. No. 337,005, Mar. 1, 1973, Pat. No. 3,851,140.

[51] Int. Cl.$^2$ .............................. B05D 7/22
[52] U.S. Cl. .................... 427/183; 427/28; 427/181; 427/195; 427/233; 427/234; 427/239
[58] Field of Search ............... 118/622, 308, 317; 427/28, 181, 183, 195, 231, 233, 234, 236, 239

[56] References Cited

U.S. PATENT DOCUMENTS

| 2,995,463 | 8/1961 | Meister et al. ........................ 427/27 |
| 3,058,443 | 10/1962 | Paton ................................. 118/622 |
| 3,065,106 | 11/1962 | Rhodes ............................... 118/622 |
| 3,077,857 | 2/1963 | Widner ............................... 118/622 |
| 3,186,860 | 6/1965 | Jones ................................. 427/27 |
| 3,212,914 | 10/1965 | Lyle et al. .......................... 427/27 |
| 3,388,685 | 6/1968 | Price ................................. 118/622 |
| 3,422,795 | 1/1969 | Smith ................................ 118/622 |
| 3,678,336 | 7/1972 | Winkles ............................. 118/622 |
| 3,697,313 | 10/1972 | Stumphauzer et al. .............. 427/239 |
| 3,726,711 | 4/1973 | Hogstrom ........................... 427/236 |
| 3,896,602 | 7/1975 | Petterson .......................... 427/183 X |
| 3,904,930 | 9/1975 | Waldron ............................ 427/28 X |
| 3,947,617 | 3/1976 | Gerek et al. ....................... 427/34 X |
| 4,025,664 | 5/1977 | Gerek et al. ....................... 427/181 X |

Primary Examiner—Shrive P. Beck
Attorney, Agent, or Firm—Trask & Britt

[57] ABSTRACT

A method for coating a slender, cylindrical container with a thin, resinous coating by spraying powdered resin is disclosed. The technique involves spraying of finely divided resin particles entrained in a gas stream at a substantially uniform rate at a velocity of from about 20 ft/min. to about 1000 ft/min. from a nozzle. The container may be sprayed by directing a continuous flow of resin particles at an accurate, predetermined rate into the container to deposit a substantially uniformly distributed coating. Alternatively, a pulse of a predetermined quantum of resin may be sprayed into a container. The resin particles are caused to adhere to the container by preheating the container, by inducing an electrostatic charge on the resin particles, or a combination of both. The coating may be matured by preheating the container to a high temperature or by postheating the coated container at temperatures in excess of about 300° F.

9 Claims, 3 Drawing Figures

CONTAINER COATING METHOD

RELATED APPLICATIONS

This application is a continuation of Ser. No. 502,811, filed Sept. 3, 1974, now abandoned which application is a continuation-in-part of U.S. applications Ser. No. 140,838, filed May 6, 1971 (now abandoned), Ser. No. 223,969, filed Feb. 7, 1972 (now U.S. Pat. No. 3,987,937) and Ser. No. 337,005, filed Mar. 1, 1973 (now U.S. Pat. No. 3,854,140), of applicant Robert G. Coucher. Reference throughout the application to copending applications refers to applications of Robert G. Coucher.

BACKGROUND OF THE INVENTION

Small-mouthed containers, primarily of metal although some heavy duty paper containers are prevalent, are utilized for many purposes, most predominantly for food and beverage—the ubiquitous "tin can". Although it is not a widely known fact, almost all "tin cans" used for food and beverage purposes are coated on the interior with a thin, usually about one mil or less, comestible (food grade) resinous coating. About 60 million pounds of resin are utilized each year in coatings for food and beverage containers. These organic resinous coatings, which may vary in composition dependent upon the ingredient which it will contact, are necessary to prevent contamination of the food or beverage by the metal container, whether said container is tin plated steel or aluminum. Contamination of food and beverage by the metal container generally affects flavor, occasionally makes the food or beverage unwholesome, and frequently affects appearance. Also, the coating promotes the shelf life of the "canned" ingredients.

A number of different resinous compositions have been utilized with success as coatings for metallic containers, particularly food and beverage containers. Although water-based coatings have been available for a number of years, the films or coating resulting therefrom have not been satisfactory for food and beverage containers; for example, beer becomes turbid when stored for even short durations in metal containers coated with a water-based resinous coating.

The mainstay of the can coating industry has been organic, solvent-based coatings—in spite of the fact that the solvent, which evaporates upon application of the coating, is 80% of the weight of the material and often has a greater cost than the resin which remains on the container. Organic, solvent-based coatings have been successful, however, because thin coatings can be applied to metal containers which do not affect substantially the taste of the food or beverage. Solvent-based coatings, however, have a very distinct disadvantage—a very large quantity of solvent evaporates into the atmosphere adjacent container coatings facilities. These organic solvents are generally noxious and frequently toxic.

One approach towards eliminating solvents from container coatings is to use 100% solids coating systems; e.g., the liquid styrene-polyester systems, epoxy resins and the like. Liquid systems containing 100% coatings solids; i.e., everything in the liquid system reacts or interacts to become an integral part of the resinous (polymeric) coating formed upon a substrate, have severe limitations in that few polymeric systems lend themselves to a liquid system wherein one of the reactants is dissolved in another reactant. Also, those 100% solids liquid systems available have such high viscosities that application by spray techniques is impracticable, if not impossible, especially when thin films are desired. A further limitation of 100% solids coatings for containers is the inclusion in the coating of a certain quantity of monomer or low molecular weight polymer which, even present as parts per million, produces odor and usually contributes taste to the coating.

Another type of 100% solids coating material is a powdered, resinous material. Powder coatings, as the term is commonly used, have been applied to objects primarily by fluid bed and electrostatic spray techniques. Fluid bed techniques are unsatisfactory to coat food and beverage containers since such technique coats both the interior and exterior, thereby consuming an uneconomical amount of resin. Also, coatings formed in a fluid bed tend to be relatively thick; e.g., five mils and greater. Electrostatic spray techniques work very well for most objects, although coatings less than one mil thick are difficult to obtain. Also, thin coatings available from current techniques tend to have substantial variation in thickness within a given container and from container to container.

However, electrostatic spray principles (a charge on the powder and an opposite charge on the object to be coated) do not work when the interior of a small cylindrical metal container is to be coated. An effect known as the Faraday Cage Effect occurs when powder containing an electrostatic charge is propelled towards the interior of an oppositely charged metal cylindrical container having one end thereon, resulting in formation of a partial coating.

DESCRIPTION OF THE INVENTION

Figure 1:
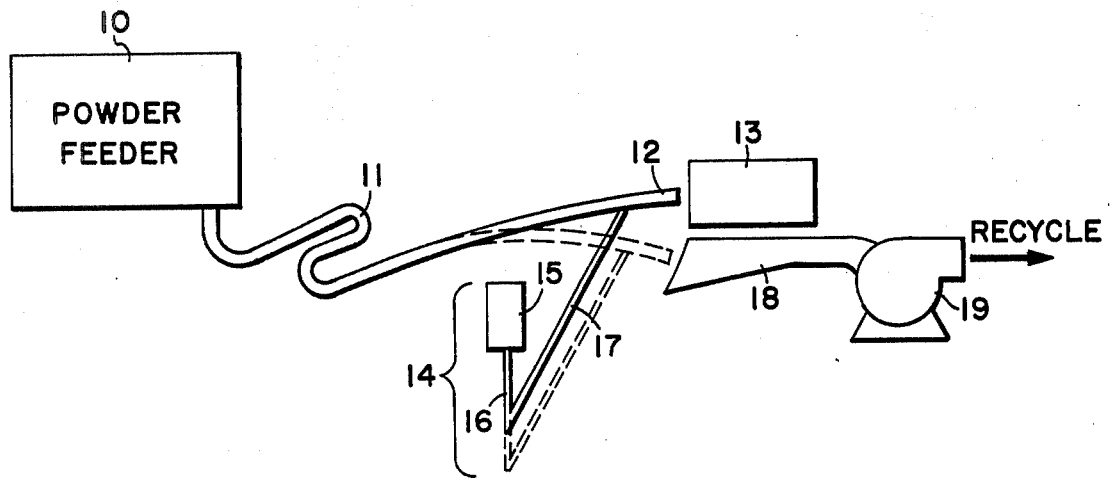
FIG. 1 is a schematic illustration of apparatus used in a continuous coating process.

A process has been invented whereby a thin, substantially uniform resinous coating can be applied to the interior of a container, particularly a cylindrical, metal container having a length substantially greater than its diameter and generally with one closed end. Coatings are readily applied at a thickness of less than one mil and coatings having a thickness of about 0.5 mil with an electrical conductivity through the film of less than about 75 milliamps are feasible.

Coatings for containers, especially containers utilized in the food industry, have certain criteria which must be met, including thinness—for economic reasons, inertness, impermeability, nonabsorptiveness and adherence. Coatings meeting these criteria can be applied by the techniques of the instant invention.

A container, particularly a slender, cylindrical container, can be coated with a thin, uniform, comestible, organic coating by pneumatically conveying finely divided resinous particles from a powder feeding device to a spraying device at a substantially constant rate which may be varied from about one gram per minute to about 150 grams per minute, although for typical commercial applications the rate is about 25 to about 100 grams per minute. The constant resin rate enhances resin distribution within a single container and enables a continuous process to produce coated containers having substantially reproducible film weights.

A discrete quantum of resinous powder is sprayed into the interior of a container, especially a container with one closed end, under conditions to create a bond between said resin particles and the interior surface of the container. The bonding between particle and container is created by preheating the container to a temperature above the softening point of the resin or by inducing an electrostatic charge on the particles, or both.

The coating of particles is substantially continuous whenever applied by a reciprocating probe. Application of particles from an external spray nozzle frequently results in coatings which are discontinuous at lower particle velocities but can be rendered continuous by heating. At higher particle velocities, continuous coatings are readily formed. When the particles are applied electrostatically, no physical change occurs in the particles, i.e., the particles do not change shape or size, but adhere to the container walls as particles. When the container is preheated to a temperature above the resin softening point, the particle's adherence to the container surface is generally accompanied by at least a slight change in particle size and shape.

Minimum preheat temperature is about 225° F. while preheat temperatures up to the metallurgical limits of the container may be utilized, e.g., 525° F. for aluminum containers and 1000° F. for steel containers. Application of particles having a low softening point, e.g., thermoset epoxy resins, frequently results in continuous coatings being applied at 225° F., while resin particles having a very low softening point, e.g., below 150° F., may be applied at 150° F., although such resin particles are difficult to store and handle without agglomeration. Increasing the preheat temperature generally assures a greater likelihood of producing a continuous coating. Preheating to temperatures of above 400° F. provides sufficient energy to mature a resinous coating, particularly a thermoset epoxy resin, if the energy is conserved, i.e., energy loss by radiation or convection is substantially reduced.

In the context of this invention, the phrase "maturing of a resin coating" includes curing of a thermoset resin and flowing of a thermoplastic resin, which, in each instance, provides a coating or film with optimum properties for that particular resin composition.

Resin particles utilized in the practice of this invention have a thickness of about five to about 100 microns with an average thickness of about 20 to 30 microns.

The resin particles are continuously fed through a spray device or they are fed in pulses of discrete quanta. During spraying of the particles, the container is preferably rotated, although it can be stationary when the particles are applied from a reciprocating probe, especially one with a circular, tangential spray pattern. Typically, the container is rotated about its central, longitudinal axis at least two revolutions during the period resin particles are being introduced into the container.

The device illustrated in FIG. 1 is an apparatus for continuously coating containers through use of a continuous supply of powdered resin. A powder feeder 10 of the type described in copending applications Ser. No. 140,838 filed May 6, 1971 and Ser. No. 223,969 filed Feb. 7, 1972, the disclosures of which are incorporated herein by reference, which supplies a substantially uniform rate of resin feed at a rate which may be varied from about 1 gm/min. to about 150 gms/min. is particularly useful in this invention. Typical resin feed rates are from about 25 gms/min. to about 100 gms/min. It is particularly significant that the resin feed rate is substantially uniform inasmuch as each container to be coated is exposed to the resin spray for the same period of time which, therefore, requires a uniform rate of feed if each container is to receive substantially the same quantity of resin. It is necessary that the containers receive the same quantity of resin inasmuch as the films to be deposited are very thin and any substantial variation in the resin feed rate will result in one container having a thick film and another container having a film which is too thin to perform its function.

At resin feed rates of about 25 gms/min. to about 100 gms/min it is particularly significant that at a given rate the percent deviation is generally less than about 5% by weight and under optimum operating conditions is less than about 2% by weight.

Film coatings with thicknesses of less than 1 mil and to about 0.5 mil are readily obtainable from the practice of this invention. Since thicknesses less than 1 mil are difficult to measure, the film thickness is often expressed in weight terms, e.g., milligrams per square inch. A film one mil thick has an approximate weight of about 20 milligrams per square inch. Thus, a film weighing 4 milligrams per square inch has a thickness of approximately 0.2 mil.

Typical container coating rates are from about 60 containers per minute to about 300 containers per minute with a typical commercial rate being about 180 to about 250 containers per minute. Thus, at a coating thickness of 0.5 mil for a container having about 43 square inches of interior surface, a total of about 430 milligrams of resin is required. A coating rate of about 60 such containers per minute requires a resin feed rate of 25,800 milligrams per minute or about 26 grams per minute. Since some resin particles may not adhere or may be lost as overspray, the actual resin particle spray output may be about five to twenty percent greater than the desired coating weight.

The thin coatings must be continuous and possess sufficient film integrity to protect the container from its ingredients and vice versa. The integrity of the film is determined by testing the electrical conductivity of the film. An arbitrary standard has been developed which requires a film to possess a film conductivity no greater than 75 milliamps for beer containers and preferably much lower than that for soft drink containers.

Electrical conductivity is, of course, affected by the thickness of the film. For example, a film having a uniform thickness of 0.5 mil may possess an electrical conductivity of 40 milliamps, while a film having the same average thickness but possessing peaks and valleys wherein the valleys comprise 50 percent or more of the film area and have a thickness of perhaps only 0.05 mil, or even possessing pores wherein no coating covers certain portions of the substrate, may possess an electrical conductivity of 80 milliamps or more. Since a coating with a uniform thickness throughout the whole coating is difficult to achieve, it is especially important to place a minimum thickness of coating on each portion of the container. For example, if it is determined that a certain coating composition applied by certain technique provides an acceptable electroconductivity at a film thickness of 0.2 mil, it is necessary that each container be coated with a coating wherein only a small percentage of the surface area has a film which is less than an average 0.2 mil.

As illustrated in FIG. 1, the powder feeder 10 feeds fine particles of a thermoplastic or thermoset resin having a particle size range of about five microns to about 100 microns. An average particle diameter is about 20 to about 30 microns for commercial resin particles. Particles having an average particle diameter less than about 10 microns have exhibited particularly thin films, e.g., generally less than 0.5 mil, when applied at higher particle velocities. The particles are delivered to a tube 11 which preferably has a diameter of about 0.1 to about 0.5 inches. The powder feeder discharges resin into the tube at a predetermined feed rate which is substantially uniform, that is, generally deviating less than 5% by weight, although there may exist a deviation of about 10 percent at any given moment. Inert gas is introduced into the powder feeder at a rate of about 1 cubic foot per hour to about 25 cubic feet per hour to convey powder through tube 11 at a velocity sufficient to eject the powder/gas mixture from a nozzle at a velocity of about 20 feet per minute to about 1600 feet per minute. A faster particle velocity is more important when spraying from a nozzle external to the container than when spraying from a probe which projects within the container, while best results are achieved at the lower resin velocities, e.g., from about 20 to about 200 feet per minute through the use of a reciprocating probe which sprays the container from within the container.

The spray nozzle 12 preferably has a diameter no larger than the interior diameter of tube 11 and in many instances the outlet diameter of the nozzle is substantially smaller than the tube diameter so that the velocity of the resin through the nozzle is increased. Nozzle outlet diameters are frequently in the range of about 0.080 inch to about 0.125 inch, and preferably about 0.10 inch to about 0.120 inch. Nozzle 12 is preferably closely adjacent to the open mouth of a container, said container having one closed end, which may be a simulated closed end, and one open end.

Container 13 is introduced to a position directly in front of nozzle 12 at a rate of about one per second to about five per second. A continuous supply of resin at a predetermined rate is discharged from nozzle 12 into container 13 for a predetermined period of time, which is usually less than the residence time of container 13 in a spraying position. For example, containers being introduced to a position before nozzle 12 at a rate of about one per second may be sprayed with resin for a period as short as 0.5 second or even 0.2 second or less. The spray period is synchronized with the reciprocating mechanism 14 comprising a pneumatic or hydraulic cylinder 15 and arms 16 and 17 which, in an up position, places nozzle 12 directly adjacent the open end of container 13 and which, in a down position (illustrated by the dotted lines), places nozzle 12 directly at a mouth of a receiver 18 in which there is a slight negative pressure due to a blower 19 which conveys the collected resin to a recycle receptacle. The recycle collection apparatus permits the continuous, uninterrupted feeding of resin of nozzle 12 and the intermittent spraying of containers.

The duration of spraying is generally determined by the minimum time required to obtain a coating which has a minimum thickness on all portions of the container's interior surface. By the practice of this invention, an average film thickness of about 0.5 mil, i.e., about 10 milligrams per square inch, provides an acceptable coating. Best results are generally achieved when the particles are applied over a period of about 0.2 to about 1.0 second.

A typical 12 ounce beer can having an interior area of about 43 square inches and requiring about 430 milligrams of coating to possess an average film thickness of about 0.5 mil, involves a resin spray rate of about 430 to about 2050 milligrams per second depending upon the duration of spraying and the amount of resin particles lost. At a coating efficiency of about 80 percent, the resin spray rate varies between about 540 to about 2500 milligrams per second. Thus, a typical 12 ounce beer container is sprayed with about 540 milligrams of resin over a period of about 0.2 to about 1.0 second with better results generally obtained with the longer spray period.

It is generally preferred to revolve the container about its central, longitudinal axis for about two revolutions during the time it is being sprayed. Because of the time available for spraying, it is generally required that the container rotate from about 300 to 3000 rpm with speeds of about 500 to about 2000 rpm being typical.

Prior to being sprayed, the containers are heated to a minimum temperature of at least 225° F. and preferably to about 300° F. or greater. It has been found that this temperature is sufficient to cause the unheated resin particles to adhere to the substrate. Preheating the containers to temperatures of about 400° F. to about 500° F. is generally sufficient to cause the coatings to flow, and in the case of thermoset resins, to cause the coatings to cure.

A uniform, continuous film can be readily developed from a well distributed discontinuous coating by heating the coated container to a temperature of about 350° F. to about 450° F. for a period of about three to about ten minutes. The process is thus readily adaptable as a replacement process for coating systems employing solvent-based resins inasmuch as such processes employ ovens to dry the film and cure it.

Figure 2:
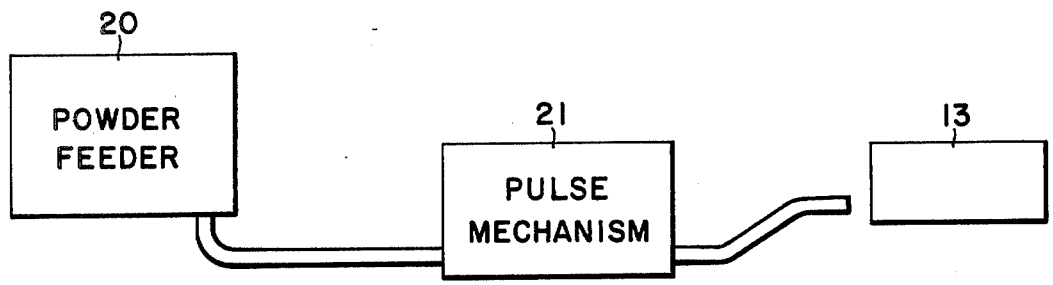
FIG. 2 is a schematic illustration of apparatus used in a pulse coating process.

In FIG. 2 an alternative technique is utilized wherein fine, resinous particles are introduced from a powder feeder in a continuous manner to a pulse mechanism which pulses discrete quanta of resin to containers supplied intermittently. The resin pulse is synchronized with the flow of containers so that a pulse of resin is discharged only during the period when a container is present before the spray nozzle. In the apparatus illustrated in FIG. 2, the powder feeder 20 is not required to introduce resinous material at a uniform rate to the pulse mechanism. A variation in the rate of feed to the pulse mechanism may be tolerated inasmuch as the pulse mechanism regulates the flow of resin to the container. The pulse mechanism 21 may be of the type illustrated in copending application Ser. No. 430,721 filed Jan. 4, 1974 (now U.S. Pat. No. 3,909,068) or copending application Ser. No. 492,498 filed July 29, 1974 (now U.S. Pat. No. 3,913,795), wherein a precise quantum of material is delivered to each container in a given pulse. The length of the pulse period and the relation of the null period between pulses may be regulated although generally a longer pulse is required to convey a larger quantity of resin to a container. The resin pulse may be regulated so that about 25 milligrams to about 500 milligrams of resin may be introduced into a container for each pulse. The resin pulse may have a period of about 0.2 second or less to about 1.0 second. The container is preferably preheated or the particles are electrostatically charged so that the sprayed material will adhere to the container. Also, the container is preferably rotated as indicated hereinabove.

A conveying gas, preferably an inert gas, is utilized to convey the resin from a powder feeder to the pulse mechanism and from the pulse mechanism to the container. The conveying gas is usually introduced at a rate of about one cubic foot per hour to about 25 cubic feet per hour, and the discharge velocity of the resin in the container is at least about 20 feet per minute and preferably from about 50 feet per minute to about 1000 feet per minute as it discharges from the spray nozzle.

The apparatus of FIGS. 1 and 2 can apply coatings to containers by placing an electrostatic charge on the resin particles which is opposite the electrical charge on the container surface. It has been found that conveying the resin at velocities in excess of about 20 feet per minute through plastic tubing, particularly polyethylene tubing, induces an electrostatic charge on the resin particles. The electrical charge is sufficient to cause the particles to adhere to the container which apparently has an inherent charge on the surface which is opposite the charge induced on the particles. In practice, it has been found that lengths of plastic tubing in excess of about 30 inches are sufficient to create sufficient electrostatic charge on particles being conveyed therein to cause said particles to adhere to the interior of a metal container.

An electrostatic charge of greater magnitude than that induced by conveyance of resins through plastic tubing may be induced in resin particles by creating a electromagnetic field through which the particles are conveyed. Conventional electrostatic equipment utilized for charging particles in other types of coating operations can be utilized.

Electrostatically charged particles contacting a metal substrate do not adhere with the tenacity of liquified particles applied by a plasma spray technique as set forth in copending application Ser. No. 430,094, filed Jan. 2, 1974 (now U.S. Pat. No. 3,962,486). Thus, some care is required in handling containers having resin particles applied to container interiors by the techniques of this invention. Aside from the degree of adherence between an electrostatically charged particle and a metal substrate, a further problem has been present in the art in attempts to coat containers electrostatically. Whenever cylindrical containers were attempted to be coated electrostatically, the coating did not cover the whole container interior because of an effect known as the Faraday Cage Effect.

Figure 3:
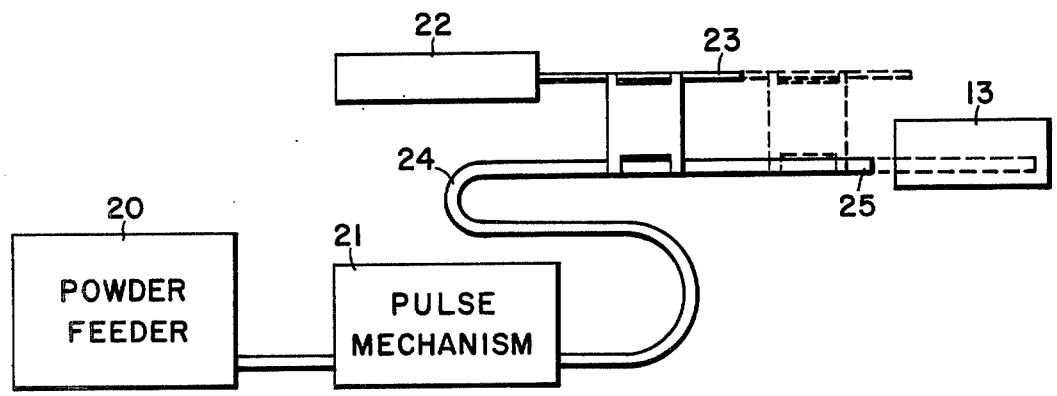
FIG. 3 is a schematic illustration of apparatus useful in a pulse-reciprocating probe process.

The Faraday Cage Effect has presented problems in regard to coating containers having the configuration illustrated in FIGS. 4 and 5 wherein a moat area, the circular depression in the bottom of the container, is present. The apparatus illustrated in FIG. 3 provides means for insuring that a coating of sufficient thickness is applied to the bottom of the container. A powder feeder 20 delivers a stream of resin particles to the pulse mechanism 21. A hydraulic or pneumatic cylinder is attached to a rod 23, which carries the delivery tube 24 and the nozzle 25. The cylinder is synchronized with the pulse mechanism so that cylinder thrusts nozzle 25 forward to a position adjacent the bottom of the container prior to the time the pulse of resin particles reaches nozzle 25. The adjacency of the nozzle to the base of the container causes the resin particles to cover the base of the container with a substantially uniform coating, including any moat area present.

The resin particles passing through nozzle 25 may be charged or uncharged. If the resin particles are uncharged, it is preferred to heat the bottom of the container to cause the particles to adhere thereto. The nozzle may be withdrawn from the container as the resin pulse continues, or a second pulse of resin may be delivered to the nozzle as it retreats from the container. If the resin particles are uncharged during this stage, it is preferred that the cylindrical walls of the container be heated so that the resin particles will adhere thereto. Although the container may be in a stationary position, particularly when the base of the container is being coated, the container is preferably revolved while the sidewalls are being coated, although stationary containers may be readily coated with a circular spray ejected peripherally from the nozzle.

The pulse mechanism of the apparatus illustrated in FIG. 3 is of a metering type so that the pulse of resin supplied to the container is in the precise quantity desired. Utilizing the apparatus illustrated in FIG. 3, it is feasible to place a slightly thicker film on the base of the container while utilizing a thinner coating on the sidewalls. Thus, it is possible to place a thicker coating on the portion of the container which is more difficult to coat while not substantially increasing the overall quantity of resin required to achieve acceptable coating.

The device illustrated in FIG. 3, comprises a powder feeder 20 and a pulse mechanism 21 which feed pulses of resinous powder through conduit 24 and nozzle 25 for injection into container 13. Hydraulic cylinder 22 and guide 23 reciprocate to insert nozzle 25 within container 13 and to remove it therefrom. Pulse mechanism 21 is synchronized with the reciprocation of nozzle 25 so that powder is sprayed only during the period the nozzle is within the container.

A technique which is especially adaptable to containers which are preheated prior to coating is immediately to postheat the container after it is sprayed and before it has had an opportunity to cool to ambient temperatures so that some advantage is received during postheating from the energy supplied during the preheating stage. The postheating may be conveniently supplied by a plasma arc device directed into the coated interior. The container may be stationary or revolved at low to high speeds. During postheating with a plasma arc, no backfiring occurs inasmuch as the resin particles are all adhered to the container wall. Also, the preheating of the container may be accomplished with a plasma device. The temperature of the container may be raised in the preheat stage of 225° F. to about 400° F. by preheating with a plasma arc for 0.2 to 1.0 second. Postheating of a film with a plasma arc device to achieve curing required from about 30 seconds to about two minutes at metal temperatures between 400° to 425° F. to provide sufficient energy so that the container and coating remain above the curing temperature for a period sufficiently long, usually two or more minutes, to allow the film to cure fully.

Utilizing a plasma arc device such as that described and claimed in copending application Ser. No. 337,005, filed Mar. 1, 1973, is particularly advantageous inasmuch as a desirable container temperature, e.g., at least 225° F. to 300° F. and preferably greater, can be achieved in a minimum of time. A plasma arc device utilizing only nitrogen as the ionizing gas produces a very hot flame which can preheat an average size beverage container to a temperature of about 400° F. in about 0.2 second.

The process utilizing a plasma arc flame to heat a typical cylindrical container may be practiced by utilizing a plasma arc device having a power level of about 6 to about 20 kilowatts. Although a mixture of ionizing gases, e.g., nitrogen and argon, can be used, it is generally preferred that nitrogen be used as the sole ionizing gas or as the major component of any gas mixture. A nitrogen arc flame is hotter and longer than an argon flame and is more effective in rapidly heating the container. A plasma arc device having a nitrogen flow rate of about 25 to about 90 cubic feet per hour with the device operated at a power of about 40 to about 60 volts and about 75 to about 250 amps produces a flame having a length of about 3.5 to about 6.0 inches. A plasma arc device operated in this manner rapidly heats a typical container to a temperature in the range of about 225° F. to about 425° F. in a very short time, e.g., a typical beverage container having an opening of about 2½ inches and a length of about 5¼ inches having a nitrogen arc flame directed into the container at a distance of about 5½ inches from the container bottom heats the container bottom to a temperature of about 250° F. to about 425° F. and heats the container sidewalls to a temperature of about 350° F. to about 400° F. in about 0.5 to about 0.2 second.

As indicated herein, preheating a container to a minimum temperature of at least 225° F. and preferably to about 300° F. or greater, causes resin particles having a lower softening point to adhere to the substrate. Preheating the containers to higher temperatures causes more resin flow upon or shortly after impact. At container temperatures above 400° F., resin particles having a low softening point flow into an impervious coating and upon conservation of the energy of the container and coating, will cure, in the case of a thermoset resin.

When postheating is employed, it is preferable to postheat immediately after the container is sprayed so that any energy remaining after preheating, if the container was preheated, can be utilized. Also, it is desirable to postheat an electrostatically coated container promptly so that handling is reduced before the particles are formed into an adherent coating. The extent of postheating depends upon the type of resin employed.

The coating process of this invention may be conducted in a typical oven used in solvent-type coating processes to evaporate the solvent and mature the coating. The containers may be preheated or postheated in a conventional oven. Also, the spray process may be conducted in an oven by utilizing water cooled nozzles and resin conveying tubes. For example, raw containers entering an oven may be coated as soon as the container temperature exceeds about 225° F. The container is continuously heated to a temperature of about 450° F. which is the approximate oven temperature of most ovens employed in solvent-spray processes. The coating is fully matured by the time the container leaves the oven. The usual residence time of 10 minutes employed in solvent-type process ovens is sufficient for curing conventional thermoset resins available as fine particles.

Typical thermoset resins useful in the instant process include epoxy resins, phenoxy resins, epoxy phenolic resins, epoxy urea resins, acrylic resins and the like. Preferred thermoset resins are those having a low temperature softening point, e.g., below 225° F., a curing temperature below about 400° F. and a rapid curing rate. Typical thermoset resins meeting these criteria are epoxy resins having an epoxide equivalent weight of about 700 to about 900, a Durran's Softening Point of about 85° C. to about 100° C. and a cure rate of about three minutes with dicyandiamide catalyst and an accelerator.

Epon 1004 is a typical epoxy resin powder utilized in the practice of this invention.

Typical thermoplastic resins useful in the instant invention are those with a flow point below the metallurgical limit of the container, e.g., about 525° F. for aluminum containers and about 1000° F. for steel containers. Thermoplastic resins having good characteristics as coatings for container interiors include nylon, polybutylene, ethylene-maleic acid copolymers and polypropylene. Resins utilized in fluid bed coating processes are useful for coating steel containers, while resins used in coating aluminum containers are generally of a slightly lower molecular weight.

EXAMPLE I

Cylindrical containers having one open end and one closed end were coated with a thermoset epoxy coating. Fine particles of an epoxy resin, Epon 1004, having an average particle size of about 20 microns were introduced into a powder feeder having the capability of feeding powder at the rate of about one gram per minute to about 150 grams per minute at a substantially constant rate.

Fine resin particles were conveyed at a substantially uniform rate of about 0.2 grams per minute by an inert gas at a rate of about 13 cubic feet per hour. The resin was conveyed through a ⅛ inch plastic tube. Resin was introduced from the tube into cylindrical containers which had been preheated to between 150° F. and 200° F. The tube was inserted into the container to a position near the closed end and withdrawn from the container at a substantially constant speed over a period of about 0.5 to about 1.0 second. Both stationary and rotated containers were coated. The resin was sufficiently softened by contact with the container interior to adhere thereto. The containers were rotated at a speed of about 500 rpm. The rotated containers had a more uniform dispersion of resin adhered to the interior surface.

The resinous coating was not continuous as applied although an average resin distribution of about 10 milligrams per square inch was achieved.

A cured, continuous coating was obtained by postheating the container at a temperature of about 425° F. for about 2 minutes. The rotated containers had a more uniform film thickness.

The resin was fed continuously by the powder feeder.

EXAMPLE II

Cylindrical containers having one open end and one closed end were coated with a thermoset epoxy resin, Epon 1004.

Fine particles having a maximum particle size of less than about 100 microns and an average particle size of about 20 microns were fed from a powder feeder device to a pulsing device having the capability of feeding predetermined pulses of resin in quantities from about 0.2 gram per minute to about 5.0 grams per minute over a pulse period of from about 0.2 second to about 1.0 second.

A container having an internal area of about 43 square inches was heated to about 200° F. A resin pulse of about 0.6 grams was sprayed into the container in an inert gas stream at a velocity of about 200 feet per minute for a period of about one second.

A discontinuous coating of resin particles adhered to the interior surface of the container.

A second container rotated at about 500 rpm was coated in a similar manner. A continuous coating of resin particles adhered to the interior surface of the container.

Both containers were postheated at 425° F. for a period of about 2 minutes. A cured, thermoset film of about 0.5 mill thickness resulted in each instance. The container which had been rotated had a significantly more uniform coating.

Both containers were subjected to an Enamelrater test. The coatings exhibited conductivities as follows:

Stationary Container: 150 milliamps
Rotated Container: 75 milliamps

Although the instant invention has been described particularly as an effective method of coating cylindrical containers, the method of preheating a substrate, especially with a plasma arc device, prior to spraying with a stream of resin particles, is effective for coil coating and for coating other types of substrates.

I claim:

1. A process of coating the interior of a cylindrical two-piece tin can container having an open end and a closed end with an ultra-thin, continuous, pore-free comestible coating comprising:
   (a) pneumatically conveying a finely divided thermosetting resinous powder from a powder feeding device to a spraying device at a substantially constant rate which deviates from the average less than about five percent by weight,
   (b) heating said container to a temperature above the softening point of the resin, and then,
   (c) pneumatically spraying into the interior of said container from a point external to said container a discrete quantum of said powder at a velocity of about 20 feet/min. to about 1600 ft./min.
   (d) heating said coating to cause said resinous particles to form a continuous uniform film of resin on the interior of said container.

2. The process of claim 1 wherein said powder is conveyed continuously at a rate of about 1 gram per minute to about 150 grams per minute.

3. The process of claim 1 wherein said resin is pulsed prior to being conveyed to a spray device.

4. The process of claim 3 wherein said pulse introduces a predetermined quantum of resin into said spraying device.

5. The process of claim 3 wherein said pulse of resin has a duration of about 1/10 second to about one second.

6. The process of claim 1 wherein said powder is conveyed continuously at a rate of about 25 grams per minute to about 100 grams per minute.

7. The process of claim 1 wherein said container is rotated rapidly about its longitudinal axis.

8. The process of claim 1 wherein said container is preheated to about 400° F.

9. The process of claim 1 wherein said resinous powder consists of particles having an average thickness of about 20 to about 30 microns and substantially no particles greater than 100 microns.

* * * * *